April 29, 1924.　　　　　J. G. CARROLL　　　　　1,492,356
WHEEL
Filed June 12, 1923　　　3 Sheets-Sheet 1

Witnesses:　　　　　　　　Inventor:
　　　　　　　　　　　　　John G. Carroll

April 29, 1924.

J. G. CARROLL 1,492,356

WHEEL

Filed June 12, 1923

Witnesses:
W. L. Kilroy
Harry E. L. White

Inventor
John G. Carroll
By Brown, Cortelyou, Drewry
Attys.

April 29, 1924.

J. G. CARROLL

WHEEL

Filed June 12, 1923    3 Sheets-Sheet 3

1,492,356

Witnesses:
W. J. Kilroy
Harry E. L. White

Inventor:
John G. Carroll

By Brown, Boettcher-Dienner

Attys

Patented Apr. 29, 1924.

1,492,356

UNITED STATES PATENT OFFICE.

JOHN G. CARROLL, OF CHICAGO, ILLINOIS, ASSIGNOR TO WALKER VEHICLE COMPANY, OF CHICAGO, ILLINOIS, A CORPORATION OF ILLINOIS.

WHEEL.

Application filed June 12, 1923. Serial No. 644,906.

*To all whom it may concern:*

Be it known that I, JOHN G. CARROLL, a citizen of the United States, residing at Chicago, in the county of Cook and State of Illinois, have invented a certain new and useful Improvement in Wheels, of which the following is a full, clear, concise, and exact description, reference being had to the accompanying drawings, forming a part of this specification.

My invention relates to wheels and more particularly to wheels of the character known as "Walker drive" vehicle wheels. This type of wheel employs a ring gear, which meshes with one or more idlers, the idlers in turn being driven by a driving pinion connected to a live spindle passing through the axle. Since the driving stresses all come upon this ring gear, it is desirable to make the same as strong as possible consistent with the requisite lightness which a road wheel should have. As the driving ring gear is of considerable diameter, the problem of securing the same in suitable driving relation to the wheel felloe and rim has presented a problem of some difficulty. This is further complicated by the fact that it is desirable to have the wheel so constructed that it can readily be disassembled for inspection or repair and bar the necessity for maintaining a suitable bath of oil or other lubricant in contact with the operating gear.

According to my invention I make the ring gear of substantially the same thickness as the felloe and provide wheel discs which have peripheral flanges feeding out against the rim and clamp these discs against the sides of the felloe and the ring gear by bolts which pass through the dividing line between the felloe and the ring gear. That is to say, the bolt holes for the clamping bolts are drilled partly in the ring gear and partly in the felloe. Thus the bolts serve the dual function of clamping the discs against the sides of the felloe and the ring gear, and also serve as keys for keying together the felloe and the ring gear.

In order to acquaint those skilled in the art with the manner of constructing and operating my invention, I shall now describe the same in connection with the accompanying drawings in which I have illustrated a specific embodiment of the invention.

Figure 1:
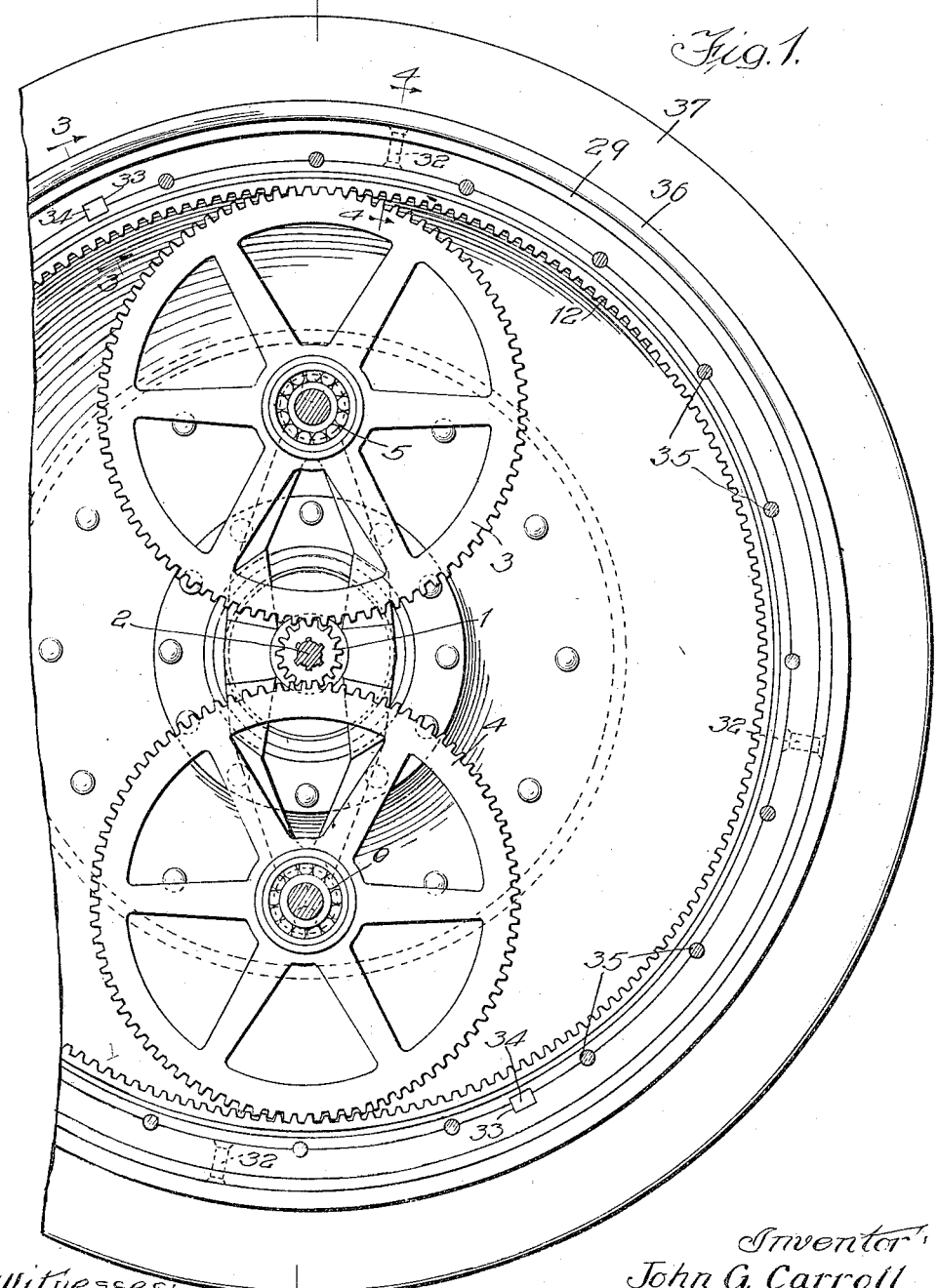
Figure 1 is a vertical section taken on the line 1—1 of Figure 2.
Figure 2:
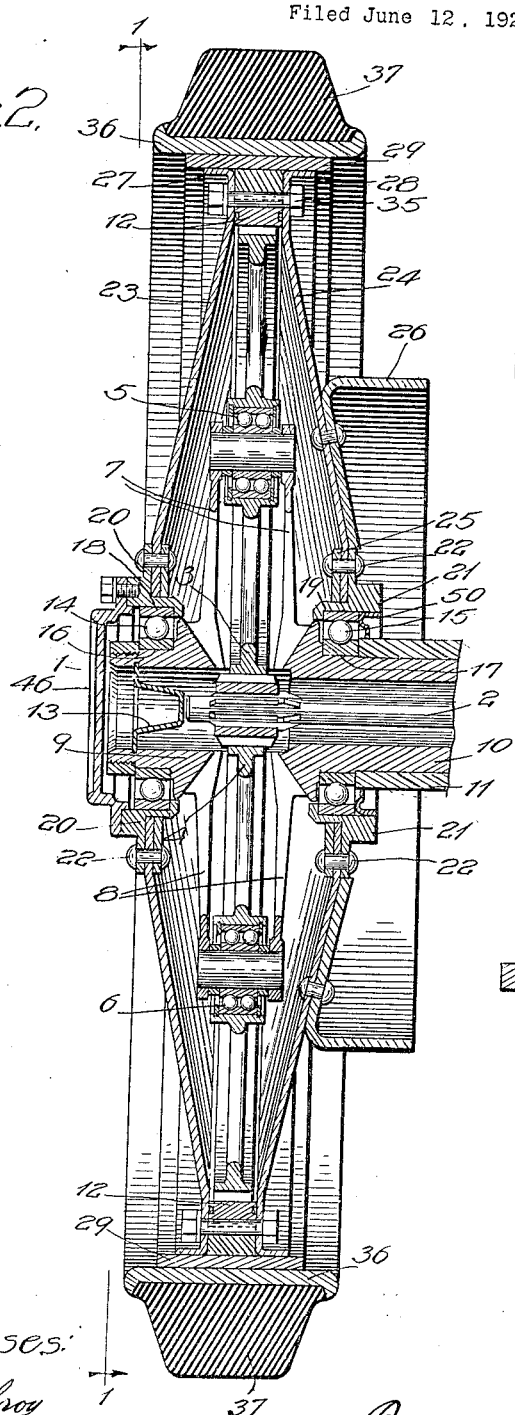
Fig. 2 is a vertical section taken on the line 2—2 of Figure 1.
Figure 3:
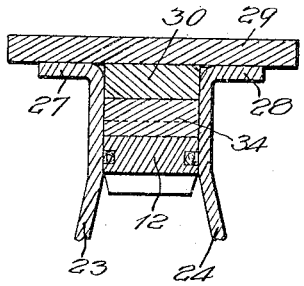
Fig. 3 is a fragmentary sectional view taken on the line 3—3 of Figure 1.

The wheel shown in Figs. 1 and 2 is of the Walker type, having a central driving pinion 1, splined or otherwise secured upon the driving spindle 2 which in turn is driven through a suitable differential by the motor or other driving mechanism, which propels the vehicle. The pinion 1 meshes with a pair of idlers 3—4 which are mounted upon bearings 5—6, supported upon the outer ends of suitable arms 7—8 of the yoke member 9. This yoke member 9 is formed on the outer end of a stub axle member 10 which fits inside of and is clamped in a socket formed in the outer end of the axle housing 11.

Since the pinion 1 meshes with the gears 3—4 and since these gears are suitably held on the bearings 5—6 and both mesh in a common outer ring gear 12, no bearing for the pinion 1 or the spindle 2 at its outer end is necessary. A suitable snap spring 13 is set in a groove in the outer end of the bore of the yoke member 9 to prevent endwise play of the spindle 2.

The wheel proper is mounted upon a pair of bearings 14—15 which have their inner races mounted upon suitable shoulders 16—17 on the yoke member 9 and their outer race members set in suitable grooves 18—19 in the hub members 20—21. These hub members are formed in the shape of rings with outwardly extending flanges to which are attached as by means of the rivet 22, suitable wheel discs 23—24. The inner edges of these discs 23—24 are clamped between the said flanges and suitable clamping rings 25 by the rivets 22.

A suitable brake drum 26 has an inwardly extending flange lying against the outside of the inner wheel disc 24, to which disc said brake drum flange is riveted.

The outer peripheries of the discs 23—24 are formed into cylindrical flanges 27—28 which fit tightly against the inner cylindrical surface of the rim member 29. The rim member 29 is considerably wider than the corresponding ring gear 12, or the felloe member 30 which lies between said rim member 29 and the ring gear 12. I do not wish to limit the invention to the use of strictly cylindrical flanges 27—28 and cylindrical inner surface of the rim 29, as these surfaces may be slightly coned in order to facilitate assembly or disassembly of the parts and to secure a better fit.

Figure 4:
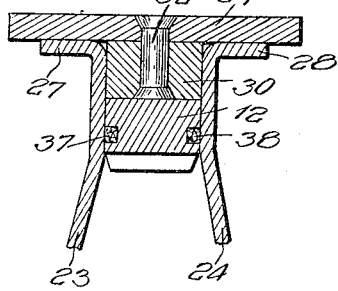
Fig. 4 is a similar fragmentary section taken on the line 4—4 of Figure 1.

The felloe 30 is embraced by the rim 29, said rim being preferably shrunk upon the felloe by heat. However, to insure that the felloe and rim will stay together, I provide a number of rivets preferably 4, as indicated at 32 in Figures 1 and 4. The inner cylindrical surface of the felloe 30 is carefully machined to the same diameter as the outside diameter of the ring gear 12 and suitable keyways are then formed as indicated at 33 to receive a pair of keys 34 holding the ring gear and felloe together while suitable holes are drilled transversely on the line of the seam between said ring gear and felloe as is clearly shown in Figures 1 and 2. The result of drilling these holes is to provide openings through which the clamping bolts 35 extend for clamping the sides of the discs 23—24 against the sides of the felloe and ring gear. The bolts 35 thus perform the double function of clamping the wheel plates firmly in place but also serving as driving keys for transmitting the driving stress from the ring gears to the felloe of the wheel. The rivets 32 insure the registry of the felloe at the center of the rim 29. The driving stresses of the felloe upon the rim are taken up through the friction existing between these two parts rather than through the rivets 32. This friction is further insured by the pressure of the tire rim 36 upon the wheel rim 29 as the tire rim is forced upon the wheel rim by hydraulic pressure. The tire rim 36 carries a suitable tire 37 which may be of any preferred type.

In order to confine a body of lubricants in the housing formed between the discs 23—24 and the ring gear 12, annular grooves 37—38 are cut in the sides of the ring gear 12 and are filled with suitable fibrous packing.

This feature of providing a packed joint between the ring gear and the side plates of the wheel is independent of the manner of attaching the plate to the felloe and of keying the ring gear and felloe together.

Figure 5:
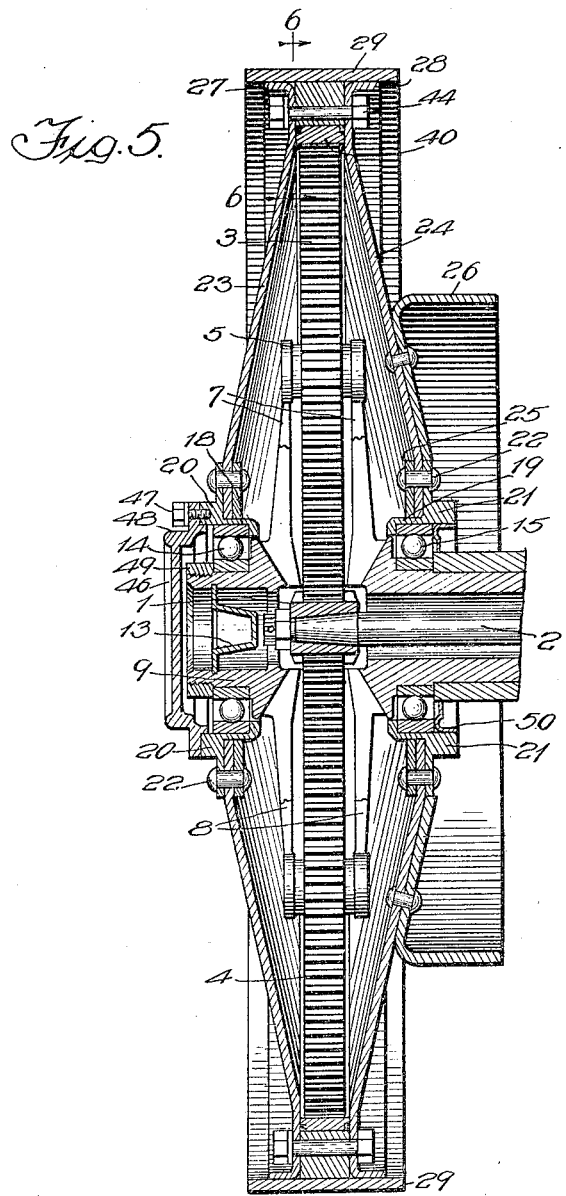
Fig. 5 is a vertical sectional view similar to Figure 2 of a modified form of the invention.
Figure 6:
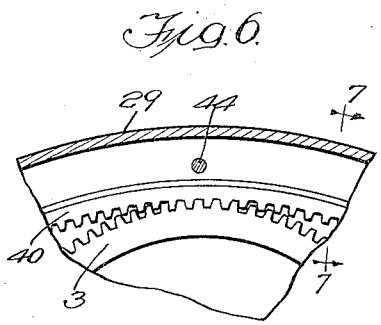
Fig. 6 is a fragmentary sectional view taken on the line 6—6 of Fig. 5.
Figure 7:
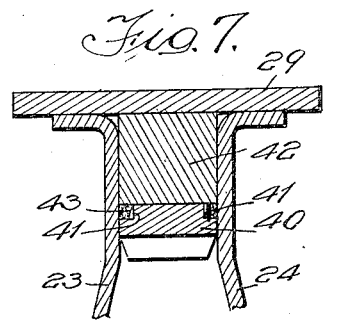
Fig. 7 is a fragmentary cross-sectional view taken on the line 7—7 of Fig. 6.

In Figures 5, 6 and 7 I have illustrated a slightly modified form of the invention in which the ring gear 40 has suitable grooves 41 cut in the outer corners thereof, so that when the ring gear 40 and the felloe 42 are assembled, circumferential channels are formed in which the packing material 43 may be confined to form a tight joint between the side plates 23 and 24 and said ring gear so that the lubricant will not escape past said packing 43. In this case the bolts 44 which hold the side plates upon the felloe and which hold the ring gear in place do not serve as keys between the ring gear and the felloe but pass solely through the side plates and the felloe. The ring gear is otherwise keyed to the felloe 42 in any preferred manner.

The lubricant may be introduced through the bore of the yoke member without removal of the wheel by merely removing the hub cap 46 which cap is held in place by suitable cap screws 47 threading into the hub ring 20, or an oil plug (not shown) may be provided near the periphery of the outer disc 23. An inwardly extending flange 48 serves to hold the outer race ring of the bearing 14 in place. The inner race ring of said bearing 14 is held in place by threaded ring 49 lying on the outer threaded end of the yoke member. The inner race of the inner bearing 15 is held in place between a shoulder on the yoke member and the inner end of the axle housing 11 and the outer race ring of said bearing is held in place in the hub ring 31 both for the formation of the bearing itself and by a dust ring 50.

As shown in Figure 5, the pinion 1 is connected to the driving spindle 2 by means of a nut and conical seat. This feature may be varied.

The provision of the packing between the side plate and the ring gear forms a tight joint so that the oil or grease does not run out through the bolt holes in the side plates and thus soil and disfigure the wheel.

I do not intend to be limited to the details shown and described.

I claim :—

1. In combination, a felloe, a ring gear lying within the felloe, a pair of side plates lying against the sides of the felloe and the ring gear, fibrous packing disposed between the ring gear and the side plates and bolts for clamping the side plates upon said ring gear and felloe, said bolts passing through the side plates beyond the location of said fibrous packing.

2. In combination, a felloe, a rim embracing the felloe and secured thereto, a ring gear lying within the felloe, a pair of wheel discs engaging the side of said felloe and ring gear, said ring gear and said felloe having registering notches forming transverse bolt holes, and bolts passing through said discs and said bolt holes for clamping the discs upon the sides of said ring gear and felloe and serving as driving keys between the ring gear and the felloe.

3. In combination a rim, a felloe embraced by the rim, a ring gear of the same width as the felloe embraced by said felloe, a plurality of bolt holes formed each partly in the ring gear and partly in the felloe, wheel discs lying flat against the sides of the ring and the felloe and clamping bolts passing through the discs and through said bolt holes.

4. In combination, a rim, a felloe of less width than the rim embraced by the rim, a ring gear of the same width as the felloe embraced by said felloe, a plurality of bolt holes formed partly in the ring gear and partly in the felloe, wheel discs lying flat against the sides of the ring and felloe and having circumferential flanges fitting against the inner periphery of the rim and clamping bolts passing through the discs and through said bolt holes.

5. In combination, a rim, a felloe embraced by the rim, a ring gear of the same width as the felloe embraced by said felloe, a plurality of bolt holes formed partly in the ring gear and partly in the felloe, wheel discs lying flat against the sides of the ring and felloe, clamping bolts passing through the discs and said bolt holes, said ring having grooves along the sides thereof and packing forming a tight joint between the discs and the ring gear to confine a body of lubricants.

6. In combination, a rim, a felloe lying inside of the rim, said rim being shrunk upon the felloe, a plurality of rivets passing radially through the rim and felloe, a driving gear lying radially within the felloe, wheel discs lying on opposite sides of the felloe and gear, said discs having flanges extending along the inner periphery of the rim, and bolts passing through the discs and through the felloe for holding said parts together.

In witness whereof, I hereunto subscribe my name this eighth day of June, 1923.

JOHN G. CARROLL